United States Patent [19]

Reinhardt et al.

[11] Patent Number: 4,815,018

[45] Date of Patent: Mar. 21, 1989

[54] SPURLESS FRACTIONAL DIVIDER DIRECT DIGITAL FREQUENCY SYNTHESIZER AND METHOD

[75] Inventors: Victor S. Reinhardt, Rancho Palos Verdes; Iradj Shahriary, Santa Monica, both of Calif.

[73] Assignee: Hughes Aircraft Company, Los Angeles, Calif.

[21] Appl. No.: 813,178

[22] Filed: Dec. 24, 1985

[51] Int. Cl.[4] ............................................. G06F 7/38
[52] U.S. Cl. ...................................................... 364/701
[58] Field of Search ........................ 364/701, 717, 703; 340/146.2; 328/14; 377/47, 48

[56] References Cited

U.S. PATENT DOCUMENTS

| | | | |
|---|---|---|---|
| 4,255,793 | 3/1981 | Nakamura | 364/701 |
| 4,365,145 | 12/1982 | Frentress | 364/717 |
| 4,468,797 | 8/1984 | Shin | 377/47 |
| 4,590,601 | 5/1986 | Beeman | 364/717 |
| 4,633,194 | 12/1986 | Kikuchi et al. | 377/47 |

FOREIGN PATENT DOCUMENTS 2095444  9/1982  United Kingdom ................ 377/48

OTHER PUBLICATIONS

Reinhardt, "Direct Digital Synthesizers", *Proceedings of the 17th Annual Precise Time and Time Interval Applications and Planning Meeting* (NASA/DOD), Washington, D.C., Dec. 3–5, 1985.

"Understanding Pseudo-Random Circuits" by Don Lancaster, *Radio Electronics*, Apr. 1976, p. 42–49.

Primary Examiner—Gary V. Harkcom
Assistant Examiner—Long T. Nguyen
Attorney, Agent, or Firm—S. M. Mitchell; M. J. Meltzer; A. W. Karambelas

[57] ABSTRACT

A direct digital frequency synthesizer including a counter circuit for receiving input signal pulses and for providing a corresponding output signal after receiving a number of input signal pulses, the number being selected based on the state of a control signal. The invention includes a circuit for generating a substantially random sequence of numbers and a comparator circuit for comparing a respective number of the substantially random numbers to a predetermined number and for providing the control signal in response thereto.

12 Claims, 3 Drawing Sheets

Fig. 1.
(PRIOR ART)
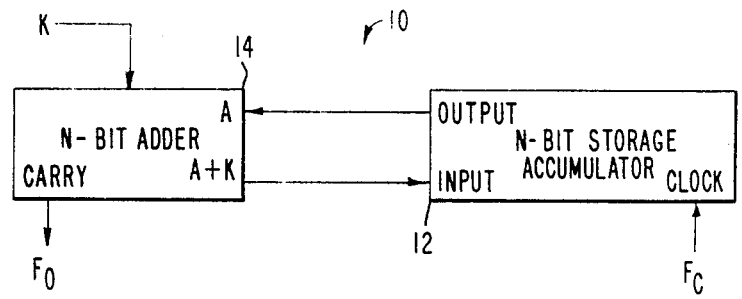
Fig. 2.
(PRIOR ART)
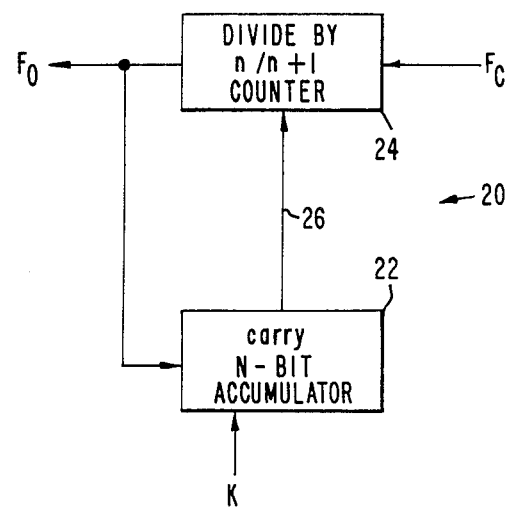
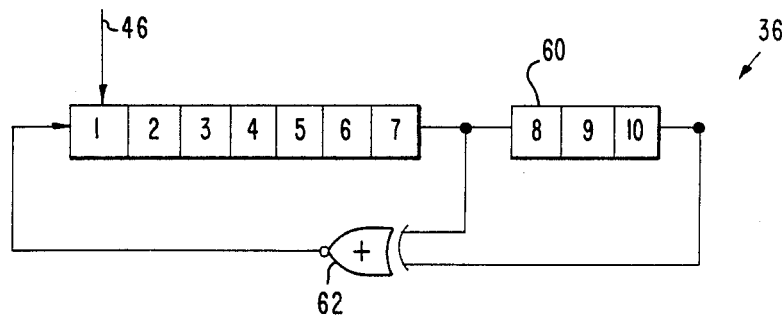
Fig. 5.

SPURLESS FRACTIONAL DIVIDER DIRECT DIGITAL FREQUENCY SYNTHESIZER AND METHOD

BACKGROUND OF THE INVENTION

1. Field of the Invention

The present invention relates to direct digital frequency synthesizers and more particularly to fractional divider direct digital frequency synthesizers.

2. Description of Related Art

Frequency synthesizers comprise important building blocks in precise time and frequency systems. Direct digital synthesizers (DDSs) which digitally synthesize waveforms without the use of phaselock techniques have become increasingly important due to the advent of large scale integrated circuits. Through the use of monolithic fabrication techniques, relatively small DDSs can be built which feature relatively high and easily expandable frequency resolutions, wide frequency ranges and short settling times.

Two important earlier types of DDSs are the pulse output DDS and the fractional divider DDS. These earlier DDSs together with other earlier DDSs are discussed in "Direct Digital Synthesizers" by Victor S. Reinhardt, *Proceedings of the* 17th Annual Precise Time and Time Interval Applications and Planning Meeting (*NASA/DOD*), Washington, D.C., Dec. 3-5, 1985.

Referring to FIG. 1, there is shown a block diagram of a typical earlier pulse output DDS (10). The pulse output DDS (10) includes an N-bit storage accumulator (12) and an N-bit adder (14) connected as shown. The N-bit adder (14) adds the frequency word k to the value in the storage accumulator (12) once during each clock period of a clock signal characterized by a clock frequency $f_c$. The N-bit adder (14) performs the addition in modulo $2^N$ arithmetic such that the adder (14) will generate a carry bit on average once every $2^N/k$ clock periods. The pulse output signal, which is characterized by a frequency $f_o$, comprises a train of pulses corresponding to a sequence of carry bits from the adder (14). Thus, the average output frequency is the average frequency of accumulator overflows which is $f_c \cdot k/2^N$.

Referring to FIG. 2, there is shown a block diagram of a typical earlier fractional divider DDS (20). The earlier fractional divider DDS (20) includes an N-bit accumulator (22) and a divide by n/n+1 counter (24) connected as shown. The counter (24) receives an input clock signal characterized by a clock frequency $f_c$ and provides an output signal characterized by an output frequency $f_o$. The accumulator (22) is clocked by the output signal such that the contents of the accumulator (22) are incremented by the frequency word k each time an output signal pulse is provided. The counter (24) performs division by n unless an accumulator carry bit is generated. Whereupon, the counter (24) receives a signal on line (26) causing it to perform division by n+1. The average output frequency $f_o$ is $f_c/(n+F)$; where $F = k/2^N$.

A problem with earlier pulse output DDSs and fractional divider DDSs of the general types described above is that the output signals produced are characterized by frequency spectrums which contain a relatively high level of spurious sidebands (spurs) when the respective value of F is not an inverse power of two. These spectral spurs occur because accumulator overflows (transitions) deviate in time (transition jitter) from that of an ideal frequency generator at an output frequency $f_o$, and because the deviations in transition time form a periodic pattern whose period is equal to some multiple of the clock period $T_c$. Hence, the periodic pattern produces a coherent frequency spectrum characterized by the spurious sidebands.

Wheately III in U.S. Pat. No. 4,410,954 which issued on Oct. 18, 1983 discloses a random jitter technique for reducing the size of spectral spurs produced by certain DDSs. His technique reduces such spurs by substantially destroying the periodicity of the accumulator overflows. In one embodiment, the technique comprises the steps of successively replacing the frequency word k by random words $k+x_i$, and by $k-x_i$, where $|x_i|$ represents a sequence of equally distributed random values from 0 to k-1. According to Wheately III, this technique eliminates spurious sidebands without detriment to the average output frequency.

While earlier DDSs generally have been successful, there have been limitations associated with their use. For example, although the technique proposed by Wheately III substantially reduces spurious sidebands, it achieves this result through relatively complex circuitry which is used to generate values $|x_i|$. This is because the properties of the substituted random word change with the synthesized output frequency. More particularly, the output frequency $f_o$ depends upon the value of k, and since typical DDSs must be capable of generating a plurality of output frequencies, the value of k must be variable. However, the value of $|x_i|$ must vary uniformly between 0 and k-1. Consequently, relatively complex circuitry must be provided for providing a random value $|x_i|$ which varies uniformly between 0 and k-1, where the value of k is variable.

Thus, there has been a need for a DDS which is characterized by an output signal having a frequency spectrum with substantially no spurious sidebands and which can be implemented using relatively simple circuitry. The present invention meets this need.

SUMMARY OF THE INVENTION

The present invention comprises a digital frequency synthesizer including a counter circuit for receiving clock signal input pulses at a clock frequency and for providing a corresponding output signal pulse after receiving a selected number of input signal pulses. The number of clock signal input pulses received before the provision of a corresponding output pulse is variable and is determined by the state of a control signal. A generator circuit is provided for generating a substantially random sequence of numbers. A comparator circuit compares respective of the generated numbers to a predetermined number and determines the state of the control signal based upon the relative magnitudes of the respective randomly generated number and the selected number.

Thus, the present invention provides a fractional divider direct digital frequency synthesizer which synthesizes an output signal characterized by an average time between output pulses which corresponds to a desired output frequency and which varies the actual time between output pulses in a substantially random manner such that no spurious sidebands are produced. Furthermore, the present invention achieves this result using relatively noncomplex circuitry.

These and other features and advantages of the present invention will become more apparent from the following detailed description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 1 is a block diagram of an earlier pulse output direct digital synthesizer;

FIG. 2 is a block diagram of an earlier fractional divider direct digital synthesizer;

FIG. 5 is a schematic diagram of pseudo-random number generator of the embodiment of FIG. 3.

DESCRIPTION OF THE PREFERRED EMBODIMENT

The present invention comprises a novel fractional divider direct digital frequency synthesizer. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 3:
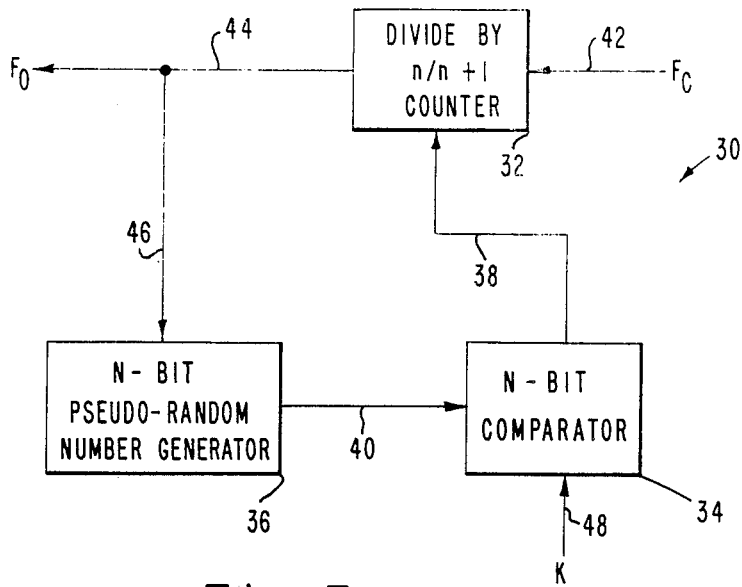
FIG. 3 is a block diagram of a presently preferred embodiment of the invention.

Referring to FIG. 3, a block diagram of a presently preferred embodiment of a novel fractional divider direct digital frequency synthesizer (30) of the present invention is shown. The novel synthesizer (30) includes a divide by n/n+1 counter (32), an N-bit binary number comparator (34) and an N-bit pseudo-random number generator (36). The counter (32) is coupled to the comparator (34) by control line (38), and the comparator (34) is coupled to the generator (36) by line (40). The counter (32) receives an input signal at a clock frequency $F_c$ on input line (42), and it provides an output signal at an output frequency $F_o$ on output line (44). Output line (44) is coupled by line (46) to the generator (36). The comparator (34) receives an N-bit word, k, on line 48.

Figure 4:
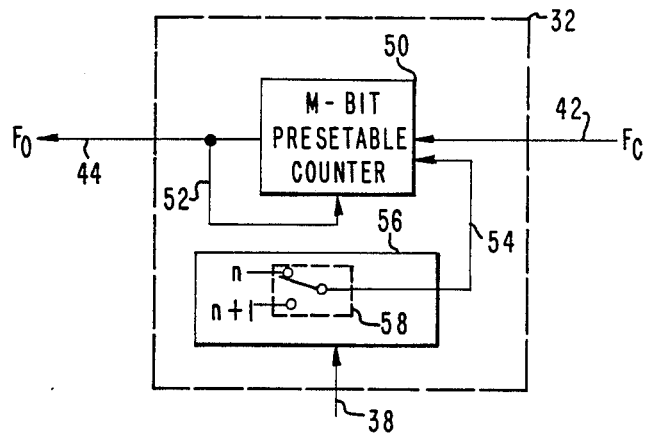
FIG. 4 is a block diagram of a divide by n/n+1 counter of the embodiment of FIG. 3.

FIG. 4 illustrates further details of the divide by n/n+1 counter (32) of the preferred embodiment. It will be appreciated that although one particular counter circuit is described herein, other circuits can be used within the scope of the invention to achieve the counter (32). The counter (32) includes an M-bit presettable counter (50) which receives the input signal on input line (42) at the clock frequency $F_c$ and provides the output signal on line (44) at the output frequency $F_o$. Those skilled in the art will appreciate that the value of M is selected such that $2^M$ is greater than n+1. Line (52) couples the output line (44) back to the counter (50). Line (54) couples the counter (50) to a memory and switch circuit (56) which includes switch (58). The memory and switch circuit (56) is coupled to control line (38).

Counters, which are well known in the art, typically provide an output pulse after receiving a selected number of input pulses and thereby accomplish what is commonly known as frequency division. For example, the M-bit presettable counter (50) provides an output pulse on output line (44) after receiving either n or n+1 input pulses on input line (42) depending upon whether the M-bit presettable counter (50) is preset to divide the input signal frequency $F_c$ by n or by n+1 as will be explained more fully hereinafter.

The M-bit presettable counter (50) receives a preset signal on line (52) each time an output pulse is provided on output line (44). The preset signal presets the M-bit presettable counter (50) to be ready to receive on line (54) a count update signal. The count update signal on line 54 determines whether the new count will extend for n or for n+1 input pulses before the provision of the next output pulse. The count update signal is provided on line (54) after the provision of a control signal on line (38).

The memory and switch circuit (56) stores the binary integers n and n+1. The control signal on line (38) takes on either a first or a second logical state. When the control signal is in the first logical state, switch (58) couples the stored binary integer n to line (54), and when the control signal is in the second logical state, switch (58) couples the stored binary integer n+1 to line (54). It will be understood that switch (58) effectively changes state upon a change in the logical state of the control signal on control line (38), and that the state of the switch (58) after the preset signal is received on line (52) will determine whether the M-bit presettable counter (50) will count n input pulses or n+1 input pulses on input line (42) before providing a corresponding output pulse on output line (44).

One skilled in the art will appreciate that the M-bit presettable counter (50) effectively divides the input signal frequency by 1/n or 1/n+1 depending upon the signal on line (54) at the time a preset signal is provided on line (52). Thus, by properly proportioning the relative time length during which the M-bit presettable counter (50) counts n input pulses between output pulses and the time during which it counts n+1 input pulses between output pulses, an average output signal frequency $F_o$ can be synthesized which is some multiple of $F_c$ between $F_c/n$ and $(F_c/n+1)$. The following description explains how such proportioning is achieved in the context of the presently preferred embodiment of the invention.

Referring now to FIG. 5, there is shown a typical well known ten it pseudo-random number generator (36) which is suitable for use in the present embodiment of the novel fractional divider direct digital synthesizer (30). "Understanding Pseudo-Random Circuits", by Don Lancaster, *Radio Electronics*, April 1976, p. 42–49 provides a discussion of typical pseudo-random number generators. The generator (36) comprises a ten stage shift register (60) which advances by one count in a pseudo-random sequence each time the register (60) receives a signal on line (46). An Exclusive-NOR gate (62) includes one input terminal coupled between the seventh and eighth stages of the register (60) and another input terminal coupled to an output terminal of the tenth stage of the register (60). The Exclusive-NOR gate (62) also includes an output terminal coupled to the input terminal of the first stage of the register (60).

The output of the Exclusive-NOR gate (62) determines what the logical state of the first stage will be after the next signal on line (46) based upon the logical states of the seventh and tenth stages before the receipt of the signal. More specifically, for example, if the seventh and tenth stages both are logical "0's" or both are logical "1's" then a logical "1" is entered into the first stage after the next signal on line (46). However, if the seventh stage is a logical "1" and the tenth stage is a logical "0" or the seventh stage is a logical "0" and the tenth stage is a logical "1" then a logical "0" is entered into the first stage after the next signal on line (46).

The pseudo-random number generator (36) generates a sequence of ten bit binary numbers which, over the relative short term, appears to be a random and unpredictable sequence in which the constituent binary numbers appear to have the same statistical distribution as random noise. However, over the relative longer term, the sequence repeats. The ten bit pseudo-random number generator (36) generates $2^N-1$ possible ten bit binary numbers in an essentially random fashion, where N is the register length, ten in this case.

One skilled in the art will appreciate that the pseudo-random number generator (36) disclosed herein is merely illustrative of many possible well known devices for generating a substantially random sequence of binary numbers. For example, a true random number generator using gaussian noise can be used to generate a non-repeating random sequence of ten bit binary numbers.

Figure 6:
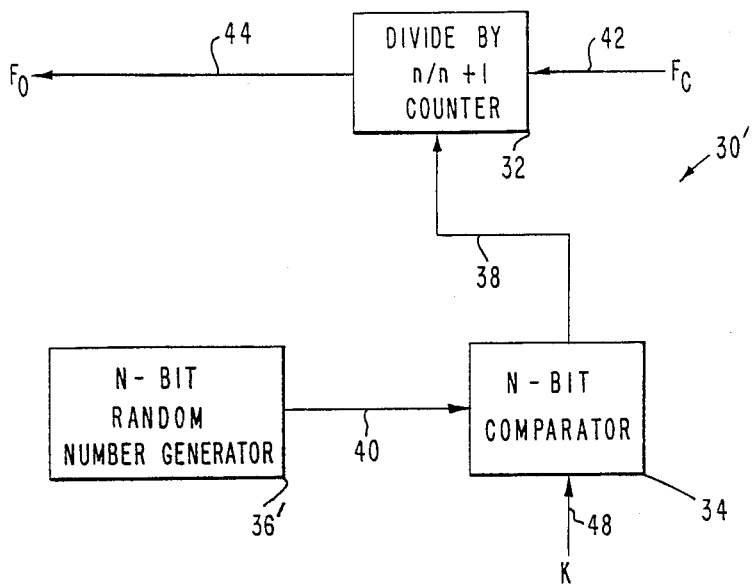
FIG. 6 shows an alternative embodiment of the direct digital synthesizer of the present invention utilizing truly a random number generator.

This is illustrated in FIG. 6 which shows an alternative embodiment 30' of the direct digital synthesizer of the present invention having a true random number generator 36' in place of the pseudo-random number generator 36 of FIG. 3.

Referring once again to FIG. 3, upon the provision of an output pulse on line (44) a signal is provided on line (46) which causes the pseudo-random number generator (36) to provide on line (40) a ten-bit pseudo-randomly generated number x to the N-bit binary number comparator (34). The comparator (34) compares the magnitude of the number x to that of the 10-bit number K.

N-bit binary number comparators of the general type described herein are well known in the art and need not be described in detail. For example, *TTL Data Book for Design Engineers, Second Edition,* published by Texas Instruments, Copyright 1976, at pages 7-56 through through 7-65 provides detailed specifications for 4-bit magnitude comparator circuits which can be cascaded to compare bit sequences of various lengths.

In operation, the divide by n/n+1 counter (32) receives an input signal on line (42) characterized by a series of input pulses occuring at clock frequency $F_c$. Assuming that the counter (32) initially is preset to count n input pulses before providing an output pulse on output line (44), upon the provision of n input pulses and a resulting output pulse, a signal is provided on line (46) which causes an N-bit pseudo-randomly generated binary number x to be provided on line (40) to comparator (38). Upon receiving the N-bit pseudo-randomly generated number x, the comparator (34) compares it in magnitude to the N-bit number K.

If the N-bit binary number x provided on line (40) is greater than the N-bit binary number K then the comparator (34) provides on control line (38) a control signal characterized by a first logical state. The control signal causes switch (58) to couple the stored binary integer n to line (54). Since the counter (50) is ready to receive a count update signal on line (54) by virtue of the preset signal provided on line (52), the counter (50) receives on line (54) the stored binary integer n. Consequently, a subsequent sequence of n input signal pulses on input line (42) will result in an output pulse on output line (44).

If, however, the N-bit binary number x provided on line (40) is less than or equal to the N-bit binary number k, then the comparator (34) provides on control line (38) a control signal characterized by a second logical state. The control signal causes switch (58) to couple the stored binary integer n+1 to line (54), and the counter (50) receives the stored binary integer n+1. Consequently, a subsequent output signal pulse on output line (44) will not occur until at least n+1 input signal pulses have been received on input line (42).

It will be appreciated that the N-bit number k is selected to be within the range from 0 to $2^N-1$. The number P is defined as $P=K/2^N-1$ for a Pseudo-randomly generated N-bit binary number x; and $P=K/2^N$ for a randomly generated number x. The probability that x is less than or equal to K is P, and the probability that x is greater than K is $(1-P)$. Thus, the average period To between output pulses on line (44) will be:

$$(1-P)\cdot(n)\cdot(T_c)+(P)\cdot(n+1)\cdot(T_c)=(n+P)\cdot(T_c).$$

Therefore, the output signal on line (44) will be characterized by an average frequency equal to $(F_c/n+P)$.

The average output frequency $F_o$, therefore, is determined by the value of the binary number K and by the value of n. In order to change the average frequency, it is merely necessary to vary either the number K or n or both.

Thus the fractional divider direct digital frequency synthesizer of the present invention synthesizes a desired average frequency of $(F_c/n+P)$ by varying the number of input pulses received by the counter (32) between the provision of an output pulse by the counter (32) in a substantially random, nondeterministic, nonperiodic manner such that no spurious sidebands are generated. Furthermore, the present invention can be implemented using relatively simple noncomplex circuitry because the pseudo-random or random binary numbers utilized during frequency synthesis are generated independently of the value of K.

It will be understood that the above-described embodiments are merely illustrative of many possible specific embodiments which can represent the principles of the invention. Numerous and varied other arrangements can readily be devised in accordance with these principles without departing from the spirit and scope of the invention. For example, if higher resolution of the synthesized output frequency is desired, the value of N can be increased to some number larger than 10. Thus, the foregoing description is not intended to limit the invention which is defined by the appended claims in which:

What is claimed is:

1. A digital frequency synthesizer comprising:
   counter circuit means for receiving input signal pulses and for providing a corresponding output signal after receiving a number of input signal pulses, the number being selected in response to a control signal;
   generator circuit means for generating a substantially random sequence of numbers; and comparator circuit means for comparing a respective to the generated numbers to a predetermined number and for providing the control signal.

2. The synthesizer of claim 1 wherein said generator circuit means comprises a random number generator.

3. The synthesizer of claim 2 wherein said generator circuit means comprises a pseudo-random number generator.

4. The synthesizer of claim 1 wherein said comparator circuit means compares the magnitude of the respective generated number to the magnitude of the predetermined number.

5. The synthesizer of claim 4 wherein said comparator circuit means provides a control signal characterized by a first state when the respective generated number is greater in magnitude than the predetermined number and provides a control signal characterized by a second state when the respective generated number is lesser in magnitude than the predetermined number.

6. The synthesizer of claim 1 wherein the number is selected from a set of positive integers.

7. The synthesizer of claim 6 wherein the set includes at least two binary integers.

8. The synthesizer of claim 1 wherein the set includes n and n+1, where n is a binary integer.

9. A direct digital frequency synthesizer comprising:
counter circuit means for receiving input signal pulses and for providing a corresponding output signal after receiving a number of input pulses, the number being selected from a set including n and n+1, where n and n+1 are binary integers, based upon a state of a control signal;
generator circuit means for generating a substantially random sequence of numbers; and
comparator circuit means for comparing a magnitude of a respective of the generated numbers to a magnitude of a predetermined number and for providing a control signal characterized by a first state when the respective generated number is greater in magnitude than the predetermined number and provides a control signal characterized by a second state when the respective generated number is lesser in magnitude than the predeterminned number.

10. The synthesizer of claim 9 wherein each number in the substantially random sequence of numbers is within a range from 0 to $2^N$, where N is a positive integer, and $N \neq 0$; and
wherein the predetermined number also is within the range from 0 to $2^N$.

11. The synthesizer of claim 9 wherein each number in the substantially random sequence of numbers is within a range from 0 to $2^N-1$, where N is a positive integer and $N \neq 0$; and
wherein the predetermined number also is within the range from 0 to $2^N-1$.

12. A method for digitally synthesizing a frequency comprising the steps of:
(a) receiving a series of input signal pulses;
(b) generating a substantially random sequence of numbers;
(c) comparing magnitudes of a respective of the randomly generated numbers to a predetermined number; and
(d)
(i) when the respective generated number is greater in magnitude than the predetermined number, providing an output signal pulse after receiving a first number of input signal pulses; and
(ii) when the respective generated number is lesser in magnitude than the predetermined number, providing an output signal pulse after receiving a second number of input signal pulses.

* * * * *